United States Patent
Wu et al.

(10) Patent No.: US 8,063,744 B2
(45) Date of Patent: Nov. 22, 2011

(54) SYSTEM AND METHOD FOR PROVIDING TIMING SERVICES AND DME AIDED MULTILATERATION FOR GROUND SURVEILLANCE

(75) Inventors: Ryan Haoyun Wu, Manlius, NY (US); Kevin Lefebvre, Manlius, NY (US)

(73) Assignee: Saab Sensis Corporation, East Syracuse, NY (US)

( * ) Notice: Subject to any disclaimer, the term of this patent is extended or adjusted under 35 U.S.C. 154(b) by 0 days.

(21) Appl. No.: 13/057,291

(22) PCT Filed: Jul. 20, 2010

(86) PCT No.: PCT/US2010/042521
§ 371 (c)(1),
(2), (4) Date: Feb. 3, 2011

(87) PCT Pub. No.: WO2011/011360
PCT Pub. Date: Jan. 27, 2011

(65) Prior Publication Data
US 2011/0156878 A1    Jun. 30, 2011

Related U.S. Application Data

(60) Provisional application No. 61/226,842, filed on Jul. 20, 2009, provisional application No. 61/226,845, filed on Jul. 20, 2009, provisional application No. 61/239,191, filed on Sep. 2, 2009.

(51) Int. Cl.
*H04Q 5/22* (2006.01)
(52) U.S. Cl. .......... 340/10.1; 342/47; 342/125
(58) Field of Classification Search .......... 340/10.1; 342/125, 47
See application file for complete search history.

(56) References Cited

U.S. PATENT DOCUMENTS

| | | | |
|---|---|---|---|
| 3,594,799 A * | 7/1971 | Michnik | 342/49 |
| 5,302,957 A * | 4/1994 | Franzen | 342/125 |
| 5,365,516 A | 11/1994 | Jandrell | |
| 6,094,169 A | 7/2000 | Smith et al. | |
| 2007/0115165 A1 | 5/2007 | Breen et al. | |
| 2007/0252760 A1 | 11/2007 | Smith et al. | |
| 2010/0001895 A1* | 1/2010 | Leeson | 342/36 |
| 2010/0079329 A1* | 4/2010 | Stayton | 342/37 |
| 2010/0202300 A1* | 8/2010 | Rhoads et al. | 370/252 |

OTHER PUBLICATIONS

Michael R. Owen, "*Correlation of DME Pulse Trains for Use in a Multilateration*," IEEE Xplore Digital Library, Integrated Communications, Navigation and Surveillance Conference, Jul. 16, 2007.

* cited by examiner

*Primary Examiner* — Jennifer Mehmood
*Assistant Examiner* — Naomi Small
(74) *Attorney, Agent, or Firm* — Burr & Brown

(57) ABSTRACT

The present invention utilizes the existing DME transponder system infrastructure to augment existing ground surveillance multilateration (MLAT) capabilities by providing additional measurements for determining the position of an aircraft equipped with a DME transponder. DME listeners receive DME interrogation signals and DME reply signals, determine TDOA between the DME transponder and each DME listener, and transmit data to a central computer that clusters TDOAs between the DME transponder and the DME listeners and computes the aircraft position using the clustered TDOAs. The DME-aided MLAT can be used as a backup surveillance system when GNSS-based systems are unavailable. The DME-aided MLAT can be integrated with SSR receive units (RUs) performing multilateration (MLAT) calculations.

27 Claims, 6 Drawing Sheets

Interrogation pulses, $P_0(t)$

DME interrogator (aircraft)

Reply pulses, $P_1(t)$ $\tau = t_1 - t_0$ $r = (\tau - t_d)/2 * C$

DME Transponder $\tau = \arg\max_\tau XCORR[P_1(t), P_0(t)]$ $XCORR[P_1(t), P_0(t)] = \int_{-\infty}^{\infty} P_1(t) P_0(t - \tau) dt$ TDOA = $t_2 - t_1$
obtained by XCORR {DL@Listener #1, DL@Listener #2}

SYSTEM AND METHOD FOR PROVIDING TIMING SERVICES AND DME AIDED MULTILATERATION FOR GROUND SURVEILLANCE

FIELD OF THE INVENTION

The present invention relates to a system and method for providing ground surveillance and timing services using the existing Distance Measuring Equipment (DME) ground station infrastructure with the addition of DME listener units according to the present invention.

BACKGROUND OF THE INVENTION

DME is a ground-based navigation system which consists of a network of ground transponders and airborne interrogating units (interrogators). The main purpose of DME transponder operations is to allow aircraft to identify and obtain a range to a DME transponder. In operation, an interrogator transmits DME pulse pair signals to be received by an intended ground transponder on a predetermined downlink frequency within the DME frequency band of 962 MHz to 1150 MHz. Upon receiving an interrogation pulse pair signal the ground transponder determines whether the received signal is a valid interrogation signal by checking the spacing between the two pulses in the DME pulse pair signal. If a valid interrogation is detected, ground transponder transmits a reply signal on a predetermined uplink frequency after a preset delay of approximately 50 µs. The reply signal consists of a pulse pair with a fixed spacing that is transmitted on a different predetermined uplink frequency within the DME frequency band. The specific pairing of interrogation and replying frequencies and the spacing between the pulses in the interrogation and replying pulse pair signals defines the DME channel/mode of the DME operation.

The interrogation and replying operation between an interrogator (e.g., aircraft) and a ground transponder enables the aircraft to determine a range to the transponder based on the observed round-trip delay between the transmission of the interrogation signal and receipt of the reply signal. FIGS. 1 and 2 illustrate the operating principles of legacy DME equipment using the interrogation and reply method of operation.

There are 126 frequency pairings (Channel #001~#126) and four spacing pairings (Mode X W Y Z) allocated for DME operation within the DME frequency band. Each channel consists of an interrogation frequency band and a replying frequency band that are separated from adjacent bands by 1 MHz. The purpose of defining DME channels and modes is to minimize the co-channel interference between adjacent DME transponders. It is important that adjacent DME transponders operate either on a different frequency or use different modes when operating on the same uplink or down link frequency.

Since the DME frequency range includes the uplink and downlink Secondary Surveillance Radar (SSR) frequency bands, the DME channels that are within these SSR frequency bands need to be reserved from usage for sites whose operating coverage area (including both interrogation and replying) overlaps with the coverage area of an operating SSR. The FAA Next Generation (NextGen) Automatic Dependent Surveillance—Broadcast (ADS-B) surveillance system, which is largely built upon SSR links, includes DME channels that overlap the SSR frequencies and these overlapping DME channels cannot be assigned to any DME operations.

Interrogation signals consist of pseudo-randomly spaced DME pulse pairs. The interrogation and reply pulses are modulated at different frequencies to minimize interference. An interrogation signal containing pseudo-randomly spaced DME pulse pairs is transmitted by the DME interrogator on a DME downlink frequency to the DME transponder, as shown in FIG. 1. Upon receiving the interrogation signal, the DME transponder determines whether the pulse pair of the interrogation signal is valid and when the received interrogation signal is valid the DME transponder replies with a reply signal containing an identical DME pulse pair to the interrogator on a DME uplink frequency after a fixed transponder delay. The DME interrogator receives the reply signal and correlates the received pulse pair in the reply signal with the known pulse pair transmitted in the interrogation signal to determine the total delay time. By subtracting the known transponder delay time ($t_d$) from the total delay time, dividing the resulting time delay by two, and then multiplying the result by the speed of light, the DME interrogator determines the range from the DME interrogator to the DME transponder.

The DME interrogation signals containing pseudo-randomly spaced DME pulse pairs do not carry any information other than the unique randomness that is only meaningful to the DME interrogator. To distinguish the pseudo-randomly spaced DME pulse pairs of a DME interrogator's interrogation signal from other interrogation signals from other DME interrogators, the pseudo-randomly spaced sequence of pulse pairs are known only to the DME interrogator so that when the DME interrogator receives a reply signal, the DME interrogator performs a correlation between the transmitted DME interrogation signal and the received DME reply signal to determine if the correct pseudo-randomly spaced DME pulse pairs can be identified in the received reply signal. An example of the pseudo-randomly spaced sequence of pulse pairs for a DME interrogation signal and the DME reply signal are shown in FIG. 2. The randomness of the interrogation pulse pair sequence varies from DME interrogator to DME interrogator. For simplicity, DME interrogators often use a random pick of a set of preselected spacing between two pairs of pulses to "stagger" the interrogation pulse pairs rather than arranging the pulse pair positions using truly random positions.

While the main purpose of the DME transponder is to reply to the interrogation signals from aircraft, the DME transponder also broadcasts its identity periodically. In accordance with international standards, approximately every 40 seconds, each transponder broadcasts its station ID using International Morse code in a time period not exceeding 10 seconds. To transmit the station ID, the DME transponder transmits a Morse code dot as a 0.1 to 0.16 second period consisting of pulse pair signals with a fixed rate of 1350 pulse pair per second (pp/s) and a Morse code dash has a period that is three times longer than the Morse code dot.

When there are either no interrogations or very few interrogations, a DME transponder maintains a minimum pulse pair transmission rate of 700 pp/s by randomly transmitting pulses that are not in response to an interrogation. When there are too many interrogations the DME transponder omits some of the interrogations and maintains a maximum transmission rate of between 2610 and 2790 pp/s. Based on the "transponder recovery time", two DME pulses that are received above a minimum triggering level no closer than 8 µs shall be able to be recognized by the transponder for decoding processing.

After receiving a DME interrogation signal containing pseudo-randomly spaced DME pulse pairs that the DME transponder determines is valid, the DME transponder will not respond to any new interrogation signals for up to 60 µs. During this "transponder dead time", the DME transponder will not reply to a second DME interrogation signal if the second DME interrogation signal arrives within 60 μs of the arrival time of the first DME interrogation signal that the DME transponder determines is valid. The purpose of this "transponder dead time" is to suppress unwanted DME interrogations caused by echo or multipath signals. The result of this "transponder dead time" is that no two DME reply signals will be transmitted closer than 60 μs on the DME reply signal frequency due to the "transponder dead time" period.

The next generation (NextGen) national airspace system (NAS) relies on GNSS-based surveillance systems (i.e., GPS) to provide aircraft position information both on the ground and airborne to the ground for surveillance and control purposes. However, existing GNSS-based surveillance systems can be disrupted by solar storms that cause severe ionosphere delay variations that degrade both GPS and WAAS and affect L1 and L5. Current correction broadcasting cannot keep up with the rapid variations in times of solar storms. In addition, there are practical concerns regarding intentional and unintentional interference, regional and temporal unavailability of GPS services, thereby causing a severe degradation or loss of GNSS-based surveillance capability.

What is needed is a system and method that provides a ground surveillance capability for determining aircraft position in the NAS (National Airspace System) as a backup to or to augment the existing GNSS-based surveillance systems.

SUMMARY OF THE INVENTION

According to a first aspect of the present invention, there is provided a method of DIME aided multilateration, the method comprising transmitting interrogation pulses from at least one DME interrogator that are received by at least one DME transponder, transmitting reply pulses from at least one DME transponder in response to the interrogation pulses received from the at least one DME interrogator, and providing at least one DME listener for receiving and demodulating the interrogation pulses transmitted by the at least one DME interrogator and the reply pulses transmitted by the at least one DME transponder, cross correlating the received interrogation pulses and reply pulses and determining a cross correlation output, determining an interrogation pattern of the received interrogation pulses and reply pulses by selecting overlapping pulses of the received interrogation pulses and reply pulses when a maximum peak of cross correlation occurs in the cross correlation output, determining a time difference of arrival (TDOA) for the associated interrogation pulses and reply pulses using the position of the maximum peak of cross correlation, known time delay of the DME transponder and known distance between the at least one DME transponder and the at least DME listener, and transmitting at least the determined TDOA, interrogation pattern information, and the ID of the DME listener to a central computer. The central computer receives at least the determined TDOA interrogation pattern information, and DME listener ID from the at least one DME listener, associates the determined TDOA to a specific transmission of interrogation pulses from the at least one DME interrogator using the interrogation pattern information to form a TDOA cluster, and determines a position for the at least one DME interrogator when three or more TDOAs are clustered. In some embodiments of the present invention, the TDOA is determined using the following equation: $TDOA = t_1 - t_3 = t_2 - \tau_2 - t_d - t_3$ where: $\tau_2$=known propagation time between DME transponder and DME listener, t1=time of arrival of DL signal at DME transponder and $t_1 = t_2 - \tau_2 - t_d$, $t_2$=time of arrival of UL signal at DME listener, $t_3$=time of arrival of DL signal at DME listener, $t_d$=known DME transponder delay, and $t_2 - t_3$ is obtained by XCORR {UL, DL}.

In some embodiments, the method further comprises determining an identity for the at least one DME interrogator using at least one of Mode A ID or Mode S address. In other embodiments, the reference transmitter is shared with Mode S multilateration receiving units (RUs). In some embodiments, the central computer is selected from the group consisting of DME transponder, DME listener, and a Secondary Surveillance Radar (SSR) transponder based RU.

In some embodiments, the method further comprises synchronizing clocks between a first DME listener and a second DME listener using a reference transmitter, wherein clock offset is determined before determining the TOA for the received interrogation pulses and reply pulses at each of the first and second DME listeners using the following equation: Clock Offset=$\tau_2 - \tau_1 - (t_2 - t_1)$, where $t_2 - t_1$ is obtained by XCORR. {UL @ DME listener #1, UL @ DME listener #2}, and $\tau_2$, $\tau_1$=(known DME transponder to DME listener distance)/(speed of light).

In some embodiments, the method further comprises integrating DME aided multilateration and Mode A/S multilateration by receiving a Mode A/S transponder transmission at more than one Mode S receiving units (RUs) that are co-located with the at least two DME listeners from a target that includes the at least one DME interrogator, deriving at least one Mode A/S signal TDOA between the at least two RUs, and associating at least one DME signal derived TDOA with the at least one Mode A/S signal derived TDOA using similarity of values within a predetermined time window.

In some of these embodiments, the Mode S derived TDOA is used to improve position accuracy to the determined position for the at least one DME interrogator.

According to a second aspect of the present invention, there is provided a method DME aided multilateration, the method comprising transmitting interrogation pulses from at least one DME interrogator that are received by at least one DME transponder, transmitting reply pulses from at least one DME transponder in response to the interrogation pulses received from the at least one DME interrogator, providing at least one DME listener for receiving and demodulating the interrogation pulses transmitted by the at least one DME interrogator and the reply pulses transmitted by the at least one DME transponder, determining an interrogation pattern of the received interrogation pulses and reply pulses, cross correlating the received interrogation pulses and reply pulses and determining a cross correlation output, determining an interrogation pattern of the received interrogation pulses and reply pulses by selecting overlapping pulses of the received interrogation pulses and reply pulses when a maximum peak of cross correlation occurs in the cross correlation output, determining a time difference of arrival (TDOA) for the associated interrogation pulses and reply pulses using the position of the maximum peak of cross correlation, known time delay of the DME transponder and known distance between the at least one DME transponder and the at least DME listener, and transmitting at least the determined TDOA, interrogation pattern information, and the ID of the DME listener to a central computer. The central computer receives at least the determined TDOA interrogation pattern information, and DME listener ID from the at least one DME listener, associates the determined TDOA to a specific transmission of interrogation pulses from the at least one DME interrogator using the interrogation pattern information to form a TDOA cluster, and determines a position for the at least one DME interrogator when three or more TDOAs are clustered. In some embodiments of the present invention, the TDOA is determined using the following equation: TDOA=$t_1-t_3=t_2-\tau_2-t_d-t_3$ where: $\tau_2$=known propagation time between DME transponder and DME listener, t1=time of arrival of DL signal at DME transponder and $t_1=t_2-\tau_2-t_d$, $t_2$=time of arrival of UL signal at DME listener, $t_3$=time of arrival of DL signal at DME listener, $t_d$=known DME transponder delay, and $t_2-t_3$ is obtained by XCORR {UL, DL}.

In some embodiments, the method further comprises determining an identity for the DME interrogator using at least one of Mode A ID or Mode S address. In other embodiments, the central computer is selected from the group consisting of DME transponder, DME listener, and a Secondary Surveillance Radar (SSR) transponder based RU. In some embodiments, the central computer assumes an altitude for the DME interrogator and determines a coarse position for the DIVER interrogator before using the Mode C information to determine a refined position for the DME interrogator.

In some embodiments, the method further comprises synchronizing clocks between a first DME listener and a second DME listener using a reference transmitter, wherein clock offset is determined before determining the TOA for the received interrogation pulses and reply pulses at each of the first and second DME listeners using the following equation: Clock Offset=$\tau_2-\tau_1-(t_2-t_1)$, where $t_2-t_1$ is obtained by XCORR {UL @ DME listener #1, UL @ DME listener #2}, and $\tau_2$, $\tau_1$=(known DME transponder to DME listener distance)/(speed of light).

According to a third aspect of the present invention, there is provided a method for DME aided multilateration, the method comprising transmitting interrogation pulses from at least one DME interrogator that are received by at least one DME transponder, transmitting reply pulses from at least one DME transponder in response to the interrogation pulses received from the at least one DME interrogator, providing at least two DME listeners for receiving and demodulating the interrogation pulses transmitted by the at least one DME interrogator and the reply pulses transmitted by the at least one DME transponder, determining a time of arrival (TOA) of each pulse pair in the received interrogation pulses and reply pulses and a received signal strength (RSS) for the received interrogation pulses and reply pulses at each of the at least two DME listeners, and transmitting at least the determined TOA of each pulse pair and RSS for the received interrogation pulses and reply pulses and the ID of the DME listener from each of the at least two DME listeners to a central computer. The central computer receives at least the determined TOA of each pulse pair and RSS for the received interrogation pulses and reply pulses and DME listener ID from each of the at least two DME listeners, associates the received interrogation pulses and reply pulses using the received TOA of each pulse pair and RSS, derives TDOAs between each DME listener of the at least two DME listeners and the at least one DME transponder from the received TOA of each pulse pair and RSS of associated interrogation pulses and reply pulses and the known distance between each DME listener of the at least two DME listeners and the at least one DME transponder, clusters the derived TDOAs to a specific transmission of interrogation pulses from the at least one DME interrogator, and determines a position for the at least one DME interrogator when three or more TDOAs are clustered. In some embodiments of the present invention, the TDOA is determined using the following equation: TDOA=$t_1-t_3=t_2-\tau_2-t_d-t_3$ where: $\tau_2$=known propagation time between DME transponder and DME listener, t1=time of arrival of DL signal at DME transponder and $t_1=t_2-\tau_2-t_d$, $t_2$=time of arrival of UL signal at DME listener, $t_3$=time of arrival of DL signal at DME listener, $t_d$=known DME transponder delay, and $t_2-t_3$ is obtained by XCORR {UL, DL}.

In some embodiments, the method further comprises determining an identity for the DME interrogator using at least one of Mode A ID or Mode S address. In other embodiments, the central computer is selected from the group consisting of DME transponder, DME listener, and a Secondary Surveillance Radar (SSR) transponder based RU. In some embodiments, the method further comprises the at least one DME listener transmitting demodulated signal waveforms for the received interrogation pulses and reply pulses from each of the at least two DME listeners to a central computer, and the central computer cross correlating the received interrogation pulses with reply pulses and determines TDOA using the peak position of the correlation output.

In some embodiments, the method further comprises synchronizing clocks between a first DME listener and a second DME listener using a reference transmitter, wherein clock offset is determined before determining the TOA for the received interrogation pulses and reply pulses at each of the first and second DME listeners using the following equation: Clock Offset=$\tau_2-\tau_1-(t_2-t_1)$, where $t_2-t_1$ is obtained by XCORR {UL @ DME listener #1, UL @ DME listener #2}, and $\tau_2$, $\tau_1$=(known DME transponder to DME listener distance)/(speed of light).

According to a fourth aspect of the present invention, there is provided a method for DME aided multilateration, the method comprising transmitting interrogation pulses from at least one DME interrogator that are received by at least one DME transponder, transmitting reply pulses from at least one DME transponder in response to the interrogation pulses received from the at least one DME interrogator, providing at least two DME listeners for receiving and demodulating the interrogation pulses transmitted by the at least one DME interrogator and the reply pulses transmitted by the at least one DME transponder, determining a time of arrival (TOA) of each pulse pair and a received signal strength (RSS) for the received DME interrogation pulses and reply pulses at each of the at least two DME listeners, and transmitting at least the determined TOA of each pulse pair and RSS for the received interrogation pulses and reply pulses and the ID of the DME listener from each of the at least two DME listeners to a central computer. The central computer receives at least the determined TOA of each pulse pair and RSS for the received interrogation pulses and reply pulses and DME listener ID from each of the at least two DME listeners, associates the received interrogation pulses and reply pulses using the received TOA of each pulse pair and RSS, derives TDOA between each of the at least two DME listeners and the at least one DME transponder from the received TOA of each pulse pair and RSS of associated interrogation pulses and reply pulses and the known distance between each of the at least two DME listeners and the at least one DME transponder, clusters the derived TDOAs to a specific transmission of interrogation pulses from the at least one DME interrogator, determines Mode C information for the DME interrogator from another source; and when two or more TDOAs are clustered, determines a position for the DME interrogator from the two TDOAs and the Mode C information. In some embodiments of the present invention, the TDOA is determined using the following equation: TDOA=$t_1-t_3=t_2-\tau_2-t_d-t_3$ where: $\tau_2$=known propagation time between DME transponder and DME listener, t1=time of arrival of DL signal at DME transponder and $t_1=t_2-\tau_2-t_d$, $t_2$=time of arrival of UL signal at DME listener, $t_3$=time of arrival of DL signal at DME listener, $t_d$=known DME transponder delay, and $t_2-t_3$ is obtained by XCORR {UL, DL}.

In some embodiments, the method further comprises determining an identity for the DME interrogator using at least one of Mode A ID or Mode S address. In other embodiments, the central computer is selected from the group consisting of DME transponder, DME listener, and a Secondary Surveillance Radar (SSR) transponder based RU. In some embodiments, the central computer assumes an altitude for the DME interrogator and determines a coarse position for the DME interrogator before using the Mode C information to determine a refined position for the DME interrogator.

In some embodiments, the method further comprises synchronizing clocks between a first DME listener and a second DME listener using a reference transmitter, wherein, clock offset is determined before determining the TOA for the received interrogation pulses and reply pulses at each of the first and second DME listeners using the following equation: Clock Offset=$\tau_2-\tau_1-(t_2-t_1)$, where $t_2-t_1$ is obtained by XCORR {UL @ DME listener #1, UL @ DME listener #2}, and $\tau_2$, $\tau_1$=(known DME transponder to DME listener distance)/(speed of light).

In other embodiments, the at least one DME listener transmits demodulated signal waveforms for the received interrogation pulses and reply pulses from each of the at least two DME listeners to a central computer, and the central computer cross correlates the received interrogation pulses and reply pulses and determines TDOA using the peak position of the correlation output.

BRIEF DESCRIPTION OF THE DRAWINGS

For a fuller understanding of the nature and objects of the invention, reference should be made to the following detailed description of a preferred mode of practicing the invention, read in connection with the accompanying drawings in which.

DETAILED DESCRIPTION OF THE INVENTION

Figure 1:
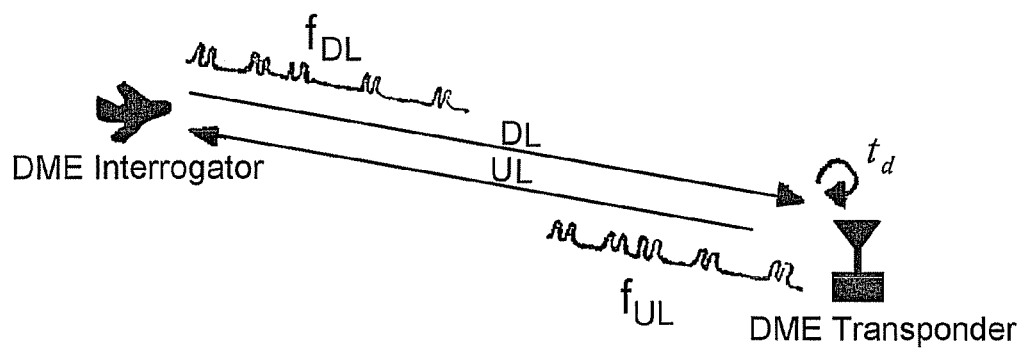
FIG. 1 illustrates the operating principles of legacy DME equipment.
Figure 2:
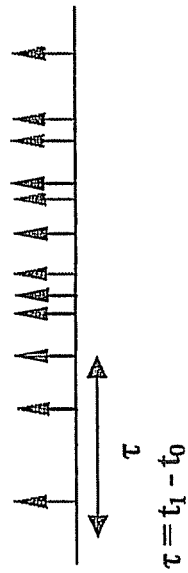
FIG. 2 illustrates the operating principles of legacy DME equipment including an example of pseudo-randomly spaced pulse pairs of a DME interrogation signal and the DME reply signal.
Figure 2:
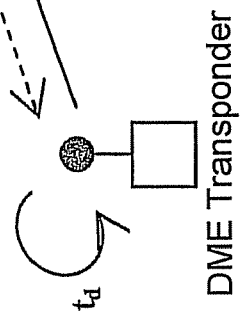

The present invention utilizes the existing DME and SSR (Mode A/C/S) transponder system infrastructure to augment existing ground surveillance capabilities by providing additional measurements for determining the position of an aircraft equipped with a DME transponder.

In the first embodiment of the present invention, a DME listener device (hereinafter DME listener) is added to the existing DME transponder system. A DME listener is a multi-channel DME receiver that receives the interrogation signals transmitted by DME transponders on aircraft (hereinafter DME interrogators) and the reply signals transmitted by the DME transponders at ground stations (hereinafter DME transponders). The DME listeners determine at least a time difference of arrival (TDOA) for each pair of received interrogation and reply signals and transmit at least TDOA data to a designated location, such as a central computer, designated DME transponder, designated DME listener or other transceiver having sufficient memory and computational capability (hereinafter central computer) to receive and store data from other DME listeners and/or DME listeners and SSR receive units (RUs) and perform multilateration (MLAT) calculations to determine a position of the DME interrogator.

In the second embodiment of the present invention, a DME transponder in the existing DME transponder ground stations is used as a reference transmitter to provide time synchronization for ground stations independent of GNSS.

DME Aided Ground Surveillance

A first embodiment of the present invention uses a DME listener to receive interrogation signals transmitted by DME interrogators and reply signals transmitted by DME transponders. The DME listener is a multi-channel DME receiver that includes a processor, a time reference, such as a GPS time receiver, atomic clock or timing reference containing a high precision oscillator, and a transmitter, such as an RF transmitter. The DME listener receives both the interrogation signals transmitted by DME interrogators and the reply signals transmitted by DME transponders within reception range of the DME listener, and then it correlates the two signals to determine a time difference between the time of receiving an interrogation signal from a DME interrogator and the time of receiving the reply signal from the DME transponder that corresponds to the interrogation signal. The present invention then uses the MLAT technique, generally known as the time difference of arrival (TDOA) MLAT technique, to determine the position of the DME interrogator. One embodiment of the present invention also uses data from SSR (Mode A/C/S) transponder systems for retrieving aircraft identity and other SSR transponder information.

One specific approach for obtaining the necessary TDOA information to perform the position determination of the DME interrogator and one specific approach for retrieving aircraft identity and other SSR transponder information are discussed in the following figures and paragraphs.

Figure 3:
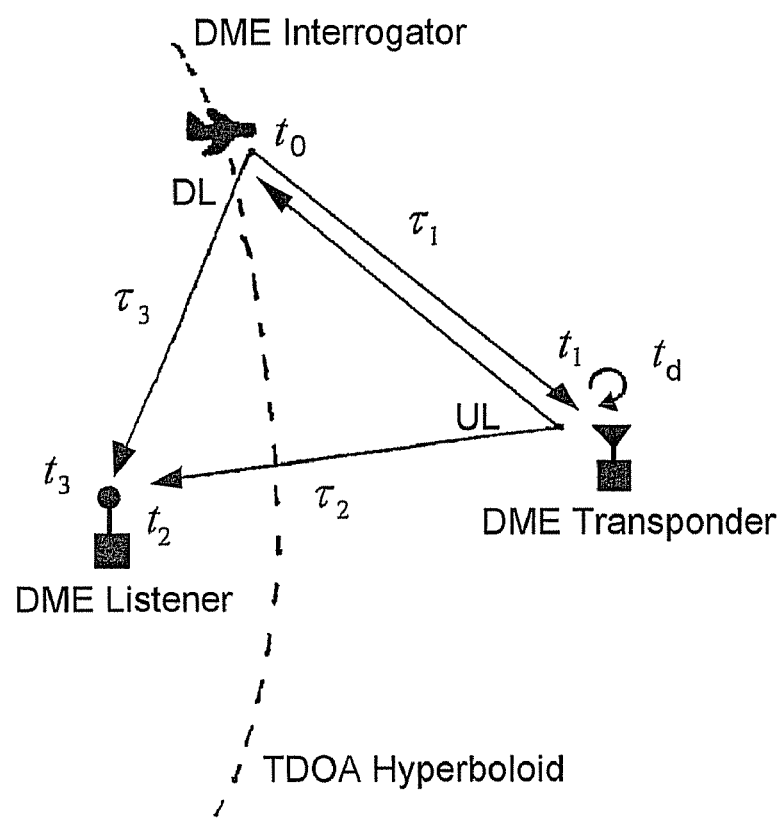
FIG. 3 illustrates one embodiment of the DME aided surveillance system of the present invention determining a TDOA between a DME transponder and a DME listener.

The basic principles for determining a TDOA between a DME listener of the present invention and the DME transponder using a DME interrogation signal transmitted by a DME interrogator is shown in FIG. 3. The DME listener receives an interrogation signal containing pseudo-randomly spaced DME pulse pairs from a DME interrogator and receives a reply signal containing the same pseudo-randomly spaced DME pulse pairs from a DME transponder.

The received interrogation signal and the received reply signal are demodulated and the DME listener cross correlates the interrogation signal and the reply signal to determine the time delay between the receipt of the interrogation signal and the reply signal.

In one embodiment, the DME listener performs the cross-correlation on the received interrogation signal and reply signal waveforms and a time delay measurement is obtained by identifying the maximum peak position of the correlated signals. The TDOA is then obtained as the time delay measurement with the known propagation delay between the DME transponder and the DME listener and the known DME transponder delay time subtracted. The DME listener also determines the pseudo-random pulse pair pattern (hereinafter the "interrogation pattern") that pertains to the DME interrogation from the aligned pulse pairs that contribute to the peak correlation of the two waveforms to associate the particular pulse pairs of the interrogation and reply signals as an interrogation event. Additionally, and not as a necessity, the time of arrival (TOA) measurements of the interrogation and reply signals at the DME listener is identified as the rising edges of the first pulses of the determined pseudo-random pulse pair sequence of the interrogation and reply signals. Further, and not as a necessity, the TOA of the interrogation signals at the DME transponder is determined according to the TOA of the interrogation signals at the DME listener and the determined TDOA.

The DME listener determines the time difference of arrival (TDOA i.e., the value of $t_1-t_3$ where $t_1=t_2-\tau_2-t_d$) between the DME listener and the DME transponder (DME transponder-listener pair) using the determined time delay measurement between the receiving time of the interrogation and the reply signals at the DME listener (the value of $t_2-t_3$), the known time delay of the DME transponder ($t_d$) and the known propagation time between the DME listener and the DME transponder ($\tau_2$), as shown in FIG. 3. The DME listener then transmits at least the TDOA, the determined interrogation pattern information and DME listener ID to the central computer.

The central computer then clusters the DME aided TDOAs of the present invention using the interrogation pattern information. The TDOA's are clustered when the interrogation pattern information is the same. The central computer then calculates the position of the DME interrogator (e.g., aircraft) from the clustered TDOAs.

The three-dimensional position of the DME interrogator (e.g., aircraft) is determined when three of more TDOA's are clustered. If only two TDOA's are associated, one embodiment of the present invention initially assumes an altitude and solves for coarse horizontal position then associates the coarse position with existing Secondary Surveillance Radar (SSR) transponder target position reports obtained from a traditional SSR or from a SSR transponder MLAT system. A refined position is then estimated by using the two TDOAs and the Mode-C altitude information obtained from the associated SSR transponder target position reports.

Figure 4:
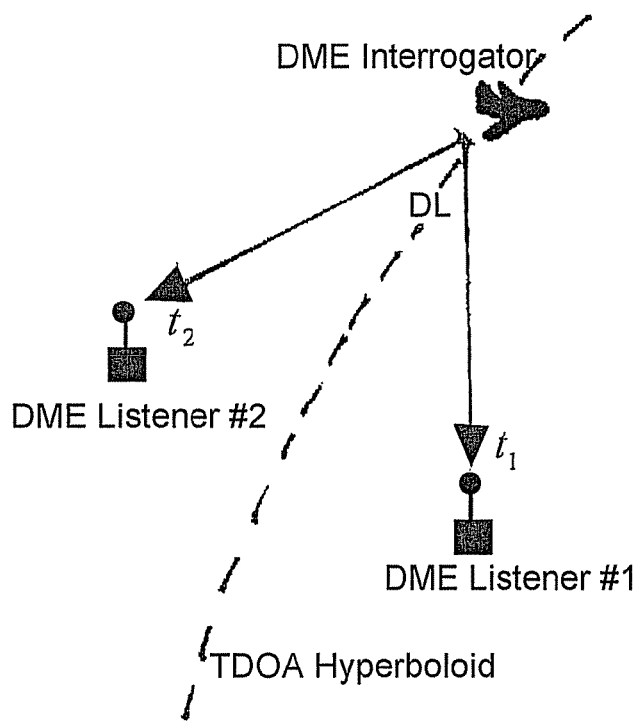
FIG. 4 illustrates one embodiment of the DME aided surveillance system of the present invention determining a TDOA between two DME listeners.

One embodiment of the present invention integrates the DME transponder-listener TDOA MLAT with DME listener-listener TDOA MLAT. FIG. 4 illustrates the basic principle of obtaining TDOA measurements between two DME listeners. The interrogation signal transmitted by the DME interrogator is received by the two DME listeners, as shown in FIG. 4. The received interrogation signal containing pseudo-randomly spaced DME pulse pairs is demodulated and the arrival time (TOA) of each pulse pair (hereinafter the DME pulse pairs sequence information) and received signal strength (RSS) of the received interrogation signal are determined. Each of the DME listeners then transmits the DME pulse pairs sequence information and RSS to a central computer. The central computer stores the received DME pulse pairs sequence information and RSS from each of the DME listeners and performs a cross correlation on the received DME pulse pairs sequence information, RSS data and known distance between the two DME listeners to determine the TDOA between the two DME listeners.

In one embodiment, each of the DME listeners also transmits the demodulated received DME interrogation signal waveforms to the central computer, when sufficient communication bandwidth is available, and the central computer performs the cross correlation on received DME interrogation signal waveforms and the TDOA is indicated by the peak position of the correlation output, which is more direct and accurate, to determine the time delay. The central computer then determines TDOA between two DME listeners (DME listener-DME listener pair) from the time delay and the known distance between the DME Listeners.

The determined TDOA between two DME listeners is then clustered with TDOAs between one or more DME transponder-DME listener pairs when the unique DME pulse pairs sequences of the DME interrogation are the same. Based on the unique interrogation pulse train pattern of each aircraft, the TDOA's obtained from DME listener-DME transponder pairs and DME listener-listener pairs can be associated together to form a bigger TDOA cluster. Note that even though the DME listener-DME listener TDOA and the DME listener-DME transponder TDOA's are mathematically dependent, the cross-listener correlation processing of the present invention provides an additional measurement that can be used for lowering the measurement noise, such that accuracy is improved. The central computer also clusters the determined TDOA between two DME listeners of the present invention with TDOAs determined by the existing ground surveillance system. The central computer then calculates the position of the DME interrogator from the determined TDOAs.

Figure 5:
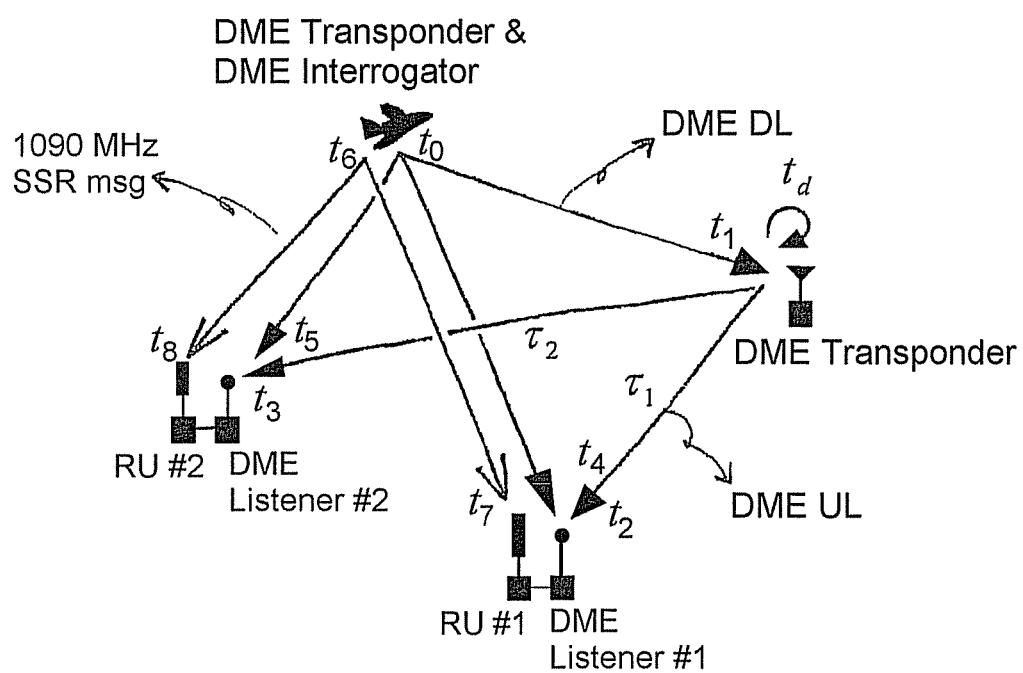
FIG. 5 illustrates one embodiment of the DME aided surveillance system of the present invention having a DME listener integrated with an SSR RU.

One embodiment of the present invention integrates the DME-aided MLAT system of the present invention with an existing RU-based SSR transponder MLAT system such as shown in FIG. 5. In this arrangement, a 1090 MHz Reference Transmitter used in RU-based MLAT system can be used by the DME-based MLAT system or the DME uplink reference transmitter can be used by the RU-based MLAT system for synchronizing clocks (time references) and performing time tracking and correction processing. If the RU and DME listener are physically integrated, the sharing of reference transmitter can be done in a physical layer by sharing the reference transmitter signal internally so that only a single receiving channel is required for the RU and DME listener.

The above described method for obtaining a TDOA measurement between two DME listeners can be used for enhancing the accuracy of an existing MLAT system. In the present invention, target positions can be determined when three or more DME listener-DME listener TDOA's are associated to form a cluster. This method of the present invention has the following features: (i) time synchronization is included as part of the disclosed method and (ii) correlation is performed on any combination of the DME pulse pairs sequence information, RSS data and signal waveforms.

In the embodiment shown in FIG. 5, the ground surveillance MLAT system includes DME listeners that are co-located and integrated with SSR RUs of the conventional RU-based SSR transponder MLAT system. The integrated MLAT system associates the DME interrogator with a SSR transponder target when the target aircraft is equipped with both a DME interrogator and an SSR transponder. The DME listeners determine TOA or TDOA for the received DME interrogation signals as discussed above and transmit at least TOA or TDOA and DME listener ID to the central computer. Similarly, the SSR RUs determine TOA or TDOA for the received SSR messages and transmit at least TOA or TDOA and SSR RU ID to the central computer.

In this embodiment, the association of a DME interrogator and a SSR transponder is done in the TDOA measurement level. By collocating DME listeners with SSR RU's, the TDOA measured by the pair of RU's (RU-RU TDOA) and the TDOA measured by a pair of the collocated DME listeners (DME listener-DIME listener TDOA) for the same target aircraft containing both transmitters are highly correlated and are associated by the central computer. An association is declared when the TDOA's or the TDOA rates of the integrated MLAT systems are approximately equal (e.g., within a predetermined delta tolerance range). TDOA rate information can be conveniently derived from the time derivatives of TDOA measurements or independently measured by observing the Frequency Difference of Arrival (FDOA) measurements which require coherent detection at the RU and DME listeners to resolve Doppler information. The use of TDOA rates enables the integrated MLAT systems to distinguish targets that have similar TDOA values. Upon association, TDOA's of the integrated MLAT systems are combined into a larger cluster by the central computer, which enables the integrated MLAT systems to determine target position with fewer ground stations.

For example, when two integrated RU/DME listeners operate with one DME transponder, as shown in FIG. 5, the present invention determines the three dimensional position of the target using two TDOA's determined by the two DME transponder-listener pairs and Mode-C altitude information according to the following equations:

DME Transponder-DME Listener TDOA's:

$$TDOA_1 = [t_2 - t_4] - t_d - \tau_1$$

$$TDOA_2 = [t_3 - t_5] - t_d - \tau_2$$

DME Listener-DME Listener TDOA $$TDOA_{12} = t_4 - t_5 = TDOA_2 - TDOA_1$$

SSR RU#1-RU#2 TDOA:

$$TDOA_{12,SSR} = t_7 - t_8 \approx TDOA_{12}$$

Target position is calculated based on measurements of:

$$\begin{bmatrix} TDOA_1 \\ TDOA_2 \\ TDOA_{12,SSR} \\ \text{Mode } C \text{ altitude} \end{bmatrix}$$

where:

$t_1$ is the TOA of the DME interrogation signal at the DME transponder;

$t_2$ is the TOA of the DME reply signal at DME listener #1;

$t_3$ is the TOA of the DME reply signal at DME listener #2;

$t_4$ is the TOA of the DME interrogation signal at DME listener #1;

$t_5$ is the TOA of the DME interrogation signal at DME listener #2;

$t_7$ is the TOA of the SSR signal at DME listener #1;

$t_8$ is the TOA of the SSR signal at DME listener #2;

$\tau_1$ is the known distance from the DME transponder to DME listener #1;

and $\tau_2$ is the known distance from the DME transponder to DME listener #2.

In this example, TDOA determined by the RU#1-RU#2 pair is a redundant measurement which is used by the present invention to reduce noise and determine a more accurate position solution. In this example, the association of the TDOA's requires the DME listener-DME listener TDOA ($TDOA_{12}$) to be available. The required TDOA may be independently measured by performing cross-DME listener correlation with the downlink DME signal and the uplink DME signal as previously described or can be dependently derived from the existing DME transponder-DME listener TDOA measurements, as shown in FIG. 5. The derived TDOA approach is utilized in a preferred embodiment due to its limited communication and processing bandwidth requirements, whereas the cross-listener correlation processes described above requires the transmission of large amounts of data over the network as well as intensive cross correlation calculations.

The aforementioned SSR-DME MLAT integration process allows the conventional SSR RU-based MLAT system to obtain additional TDOA measurements from new sources (a contributing DME transponder is equivalent to one additional RU) such that better coverage and/or accuracy can be achieved without adding new SSR RU ground stations. Similarly the SSR-DME MLAT integration improves the coverage, accuracy, and utility of the DME-based MLAT system by providing target identity, altitude, other SSR transponder information, and additional TDOA measurements from the RU-based MLAT system. From the above descriptions, the synergy of the integrated MLAT systems is obvious.

Since DME/DME Area Navigation (RNAV) requires at least two DME transponders to be in sight of a DME interrogator to determine the position of the DME interrogator, as more DME transponders and RU's are available in the integrated MLAT systems more robust performance can be achieved in these regions, such as a doubling of DME coverage. Further, when the SSR RU-based MLAT system interrogates targets for range and Mode A/C information, the integrated MLAT systems will have better position determination performance due to the additional range information and the unambiguous Mode A/C information of targets.

While the present invention is primarily focused on augmenting existing ground surveillance systems or providing a backup surveillance capability by providing additional TDOA measurements, the present invention can also be utilized as a standalone surveillance system. The DME-based MLAT system can also be used for enhancing the performance or reducing the cost of a conventional SSR RU-based MLAT systems.

One advantage of the present invention is the ability to reduce the number of ground stations being deployed due to the high costs involved in establishing and maintaining each ground station. In the USA, DME/DME RNAV has been considered as a potential backup solution to future GNSS based navigation system and studies performed by MITRE Corporation and FAA reports have suggested more DME stations are required to achieve the stated coverage goals. The present invention enables conventional SSR RU-based MLAT systems to operate with fewer ground stations which creates a competitive edge over other MLAT systems.

DME Reference Transmitter

According to a second embodiment of the present invention, there is provided a system and method for time synchronization for wide-area multilateration (WAM) ground stations using DME transponders as reference transmitters to maintain WAM ground stations synchronized in time for WAM TDOA measurements when a GNSS time reference is not available.

In the context of using wide-area multilateration as a backup surveillance capability for ADS-B, the WAM ground stations must be time synchronized and the time synchronization between WAM ground stations needs to be performed independent of GPS or an event interrupting GPS availability would render the WAM surveillance capability unavailable at the same time ADS-B is unavailable. One way to achieve time synchronization is by adding reference transmitter that is in view of multiple WAM ground stations to synchronize the WAM measurements in time.

For example, the accuracy of the TDOA determined from a DME listener-DME listener pair discussed above relies on the time synchronization of the clocks of the two DME listeners. One embodiment of the present invention uses an existing ground-based transmitter, such as a DME transponder or a Sensis 1090 MHz Reference Transmitter, as a reference transmitter to synchronize the clocks or time references of the two DME listeners. Since DME transponders are already positioned in ground stations that are controlled and maintained by FAA, using existing DME transponders as reference transmitters avoids most of the infrastructure costs associated with having to erect new reference transmitter stations. In this embodiment, no other independent time reference is required.

Figure 6:
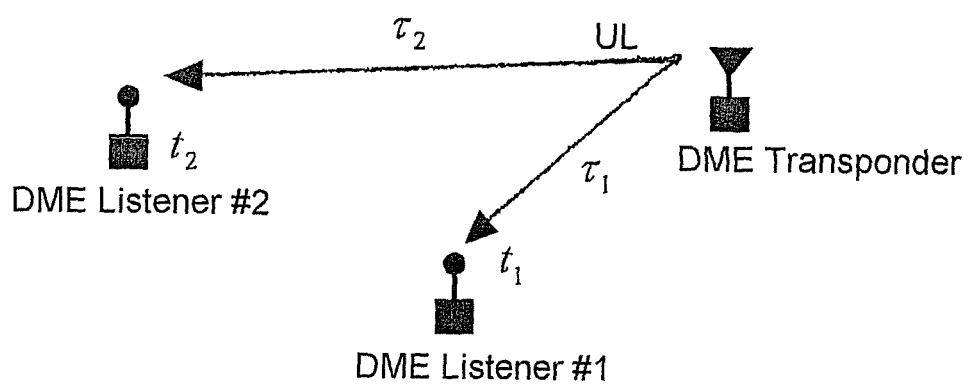
FIG. 6 illustrates one embodiment of the DME aided surveillance system of the present invention determining a clock offset between two DME listeners.

In one embodiment, the reference transmitter transmits a timing synchronization signal on a DME uplink, as shown in FIG. 6. The reference transmitter transmits a timing synchronization signal on a DME uplink and each of the two DME listeners receives the timing synchronization signal and determines a TOA for the timing synchronization signal. Each of the DME listeners transmits at least the TOA data and DME listener ID to a central computer.

The central computer determines the clock offset between the two DME listeners using the following equation:

$$\text{Clock Offset} = t_2 - t_1 - (\tau_2 - \tau_1)$$

where:
 $t_1$ is the TOA of the DME reply signal at DME listener #1;
 $t_2$ is the TOA of the DME reply signal at DME listener #2;
 $\tau_1$ is the known distance from the DME transponder to DME listener #1;
 $\tau_2$ is the known distance from the DME transponder to DME listener #2;
 $t_2-t_1$ is obtained by XCORR {UL @ DME Listener #1, UL @ DME Listener #2}; and
 $\tau_2-\tau_1$ is determined from the known DME transponder-DME listener distance divided by the speed of light.

The central computer then transmits the determined clock offset for each DME listener to the applicable DME listener.

To use DME as a reference transmitter, there must be a line-of-sight (LOS) signal propagation path between the DME transponder and a ground station, or a fixed reflection path if LOS does not exist. In either case, the propagation delay must be known and measurable for time synchronization.

Since the conventional DME signal does not encode any information, the time synchronization must be operated on the pulse positions when using DME signals for reference transmitter purposes. The DME pulse timestamps produced by different ground stations provide the basis of time corrections of the WAM measurement timestamps among different ground stations. The offsets and drift rates of measurement timestamp between a pair of ground stations can be periodically tracked by comparing the cross correlation of the DME pulse timestamps and the known delays such that the measurement timestamps can be corrected accordingly.

Where there are two groups of ground stations in an area that includes a reference transmitter that is in view of both groups, the two groups of ground stations can be time synchronized if at least one common ground station is present in both of the groups. Based on the same principle, when a reference transmitter is in view of multiple groups of ground stations, multiple groups of ground stations can be time synchronized if at least one common ground station is present in each of the multiple groups.

It will be understood that various modifications and changes may be made in the present invention by those of ordinary skill in the art who have the benefit of this disclosure. All such changes and modifications fall within the spirit of this invention, the scope of which is measured by the following appended claims.

The invention claimed is:

1. A method DME aided multilateration, the method comprising:
 transmitting interrogation pulses from at least one DME interrogator that are received by at least one DME transponder;
 transmitting reply pulses from at least one DME transponder in response to the interrogation pulses received from the at least one DME interrogator;
 providing at least one DME listener for
  receiving and demodulating the interrogation pulses transmitted by the at least one DME interrogator and the reply pulses transmitted by the at least one DME transponder,
  cross correlating the received interrogation pulses and reply pulses and determining a cross correlation output;
  determining an interrogation pattern of the received interrogation pulses and reply pulses by selecting overlapping pulses of the received interrogation pulses and reply pulses when a maximum peak for cross correlation occurs in the cross correlation output,
  determining a time difference of arrival (TDOA) for the associated interrogation pulses and reply pulses using the position of the maximum peak of cross correlation, known time delay of the DME transponder and known distance between the at least one DME transponder and the at least DME listener,
  transmitting at least the determined TDOA, interrogation pattern information, and the ID of the DME listener to a central computer;
 wherein the central computer
  receives at least the determined TDOA interrogation pattern information, and DME listener ID from the at least one DME listener,
  associates the determined TDOA to a specific transmission of interrogation pulses from the at least one DME interrogator using the interrogation pattern information to form a DOA cluster, and
  determines a position for the at least one DME interrogator when three or more TDOAs are clustered.

2. The method of claim 1, wherein the TDOA is determined using the following equation:

$$\text{TDOA} = t_1 - t_3 = (t_2 - \tau_2 - t_d) - t_3$$

where: $\tau_2$=Known propagation time between DME transponder and DME listener;
 $t_1$=time of arrival of DL signal at DME transponder and $t_1 = t_2 - \tau_2 - t_d$;
 $t_2$=time of arrival of UL signal at DME listener;
 $t_3$=time of arrival of DL signal at DME listener;
 $t_d$=Known DME transponder delay; and
 $t_2-t_3$ is obtained by XCORR {UL, DL}.

3. The method of claim 1, further comprising determining an identity for the at least one DME interrogator using at least one of Mode A ID or Mode S address.

4. The method of claim 1, further comprising synchronizing clocks between a first DME listener and a second DME listener using a reference transmitter, wherein clock offset is determined before determining the TOA for the received interrogation pulses and reply pulses at each of the first and second DME listeners using the following equation:

$$\text{Clock Offset} = \tau_2 - \tau_1 - (t_2 - t_1)$$

where: $t_2-t_1$ is obtained by XCORR {UL @ DME listener #1, UL @ DME listener #2}, and $\tau_2, \tau_1$ = (known DME transponder to DME listener distance)/(speed of light).

5. The method of claim 4, wherein the reference transmitter is shared with Mode S multilateration receiving units (RUs).

6. The method of claim 1, further comprising integrating DME aided multilateration and Mode A/S multilateration by receiving a Mode A/S transponder transmission at two or more Mode S receiving units (RUs), from a target that includes the at least one DME interrogator, wherein at least two Mode S RUs are each co-located with a DME listener, deriving at least one Mode A/S signal TDOA measured at the more than one RU, and associate at least one DME signal derived TDOA with the at least one Mode A/S signal derived TDOA based on similarities in TDOA and TDOA rate values within a predetermined time window.

7. The method of claim 6, wherein the Mode A/S derived TDOA is used to improve position accuracy to the determined position for the at least one DME interrogator.

8. The method of claim 1, wherein the central computer is selected from the group consisting of DME transponder, DME listener, and Secondary Surveillance Radar (SSR) transponder based RU.

9. A method DME aided multilateration, the method comprising:

transmitting interrogation pulses from at least one DME interrogator that are received by at least one DME transponder;

transmitting reply pulses from at least one DME transponder in response to the interrogation pulses received from the at least one DME interrogator;

providing at least one DME listener for receiving and demodulating the interrogation pulses transmitted by the at least one DME interrogator and the reply pulses transmitted by the at least one DME transponder, cross correlating the received interrogation pulses and reply pulses and determining a cross correlation output;

determining an interrogation pattern of the received interrogation pulses and reply pulses by selecting overlapping pulses of the received interrogation pulses and reply pulses when a maximum peak for cross correlation occurs in the cross correlation output, determining a time difference of arrival (TDOA) for the associated interrogation pulses and reply pulses using the position of the maximum peak of cross correlation, known time delay of the DME transponder and known distance between the at least one DME transponder and the at least one DME listener, transmitting at least the determined TDOA, interrogation pattern information, and the ID of the DME listener to a central computer;

wherein the central computer receives at least the determined TDOA interrogation pattern information, and DME listener ID from the at least one DME listener, associates the determined TDOA to a specific transmission of interrogation pulses from the at least one DME interrogator using the interrogation pattern information to form a TDOA cluster, determines Mode C information for the DME interrogator from another source, and when two or more TDOAs are clustered, determines a position for the DME interrogator from the two TDOAs and the Mode C information.

10. The method of claim 9, wherein the TDOA is determined using the following equation:

$$\text{TDOA} = t_1 - t_3 = (t_2 - \tau_2 - t_d) - t_3$$

where: $\tau_2$ = Known propagation time between DME transponder and DME listener;

$t_1$ = time of arrival of DL signal at DME transponder and $t_1 = t_2 - \tau_2 - t_d$;

$t_2$ = time of arrival of UL signal at DME listener;

$t_3$ = time of arrival of DL signal at DME listener;

$t_d$ = Known DME transponder delay; and $t_2 - t_3$ is obtained by XCORR {UL, DL}.

11. The method of claim 9, further comprising determining an identity for the DME interrogator using at least one of Mode A ID or Mode S address.

12. The method of claim 9, further comprising synchronizing clocks between a first DME listener and a second DME listener using a reference transmitter, wherein clock offset is determined before determining the TOA for the received interrogation pulses and reply pulses at each of the first and second DME listeners using the following equation:

$$\text{Clock Offset} = \tau_2 - \tau_1 - (t_2 - t_1)$$

where: $t_2-t_1$ is obtained by XCORR {UL @ DME listener #1, UL @ DME listener #2}, and $\tau_2, \tau_1$ = (known DME transponder to DME listener distance)/(speed of light).

13. The method of claim 9, wherein the central computer assumes an altitude for the DME interrogator and determines a coarse position for the DME interrogator before using the Mode C information to determine a refined position for the DME interrogator.

14. The method of claim 9, wherein the central computer is selected from the group consisting of DME transponder, DME listener, and SSR transponder based RU.

15. A method for DME aided multilateration, the method comprising:

transmitting interrogation pulses from at least one DME interrogator that are received by at least one DME transponder;

transmitting reply pulses from at least one DME transponder in response to the interrogation pulses received from the at least one DME interrogator;

providing at least two DME listeners for receiving and demodulating the interrogation pulses transmitted by the at least one DME interrogator and the reply pulses transmitted by the at least one DME transponder, determining a time of arrival (TOA) of each pulse pair in the received interrogation pulses and reply pulses and a received signal strength (RSS) for the received interrogation pulses and reply pulses at each of the at least two DME listeners, and transmitting at least the determined TOA of each pulse pair and RSS for the received interrogation pulses and reply pulses and the ID of the DME listener from each of the at least two DME listeners to a central computer;

wherein the central computer
receives at least the determined TOA of each pulse pair and RSS for the received interrogation pulses and reply pulses and DME listener ID from each of the at least two DME listeners,
associates the received interrogation pulses and reply pulses using the received TOA of each pulse pair and RSS,
derives TDOAs between each DME listener of the at least two DME listeners and the at least one DME transponder from the received TOA of each pulse pair and RSS of associated interrogation pulses and reply pulses and the known distance between each DME listener of the at least two DME listeners and the at least one DME transponder,
clusters the derived TDOAs to a specific transmission of interrogation pulses from the at least one DME interrogator, and
determines a position for the at least one DME interrogator when three or more TDOAs are clustered.

16. The method of claim 15, wherein the TDOA is determined using the following equation:

$$TDOA = t_1 - t_3 = (t_2 - \tau_2 - t_d) - t_3$$

where: $\tau_2$=Known propagation time between DME transponder and DME listener;
$t_1$=time of arrival of DL signal at DME transponder and $t_1 = t_2 - \tau_2 - t_d$;
$t_2$=time of arrival of UL signal at DME listener;
$t_3$=time of arrival of DL signal at DME listener;
$t_d$=Known DME transponder delay; and
$t_2 - t_3$ is obtained by XCORR {UL, DL}.

17. The method of claim 15, further comprising determining an identity for the DME interrogator using at least one of Mode A ID or Mode S address.

18. The method of claim 15, further comprising synchronizing clocks between a first DME listener and a second DME listener using a reference transmitter, wherein clock offset is determined before determining the TOA for the received interrogation pulses and reply pulses at each of the first and second DME listeners using the following equation:

$$\text{Clock Offset} = \tau_2 - \tau_1 - (t_2 - t_1)$$

where: $t_2 - t_1$ is obtained by XCORR {UL @ DME listener #1, UL @ DME listener #2}, and
$\tau_2, \tau_1$=(known DME transponder to DME listener distance)/(speed of light).

19. The method of claim 15, wherein the at least one DME listener transmits demodulated signal waveforms for the received interrogation pulses and reply pulses from each of the at least two DME listeners to a central computer, and the central computer cross correlates the received interrogation pulses with reply pulses and determines TDOA using the peak position of the correlation output.

20. The method of claim 15, wherein the central computer is selected from the group consisting of DME transponder, DME listener, and SSR transponder based RU.

21. A method for DME aided multilateration, the method comprising:
transmitting interrogation pulses from at least one DME interrogator that are received by at least one DME transponder;
transmitting reply pulses from at least one DME transponder in response to the interrogation pulses received from the at least one DME interrogator;
providing at least two DME listeners for
receiving and demodulating the interrogation pulses transmitted by the at least one DME interrogator and the reply pulses transmitted by the at least one DME transponder,
determining a time of arrival (TOA) of each pulse pair and a received signal strength (RSS) for the received DME interrogation pulses and reply pulses at each of the at least two DME listeners, and
transmitting at least the determined TOA of each pulse pair and RSS for the received interrogation pulses and reply pulses and the ID of the DME listener from each of the at least two DME listeners to a central computer;
wherein the central computer
receives at least the determined TOA of each pulse pair and RSS for the received interrogation pulses and reply pulses and DME listener ID from each of the at least two DME listeners,
associates the received interrogation pulses and reply pulses using the received TOA of each pulse pair and RSS,
derives TDOA between each of the at least two DME listeners and the at least one DME transponder from the received TOA of each pulse pair and RSS of associated interrogation pulses and reply pulses and the known distance between each of the at least two DME listeners and the at least one DME transponder,
clusters the derived TDOAs to a specific transmission of interrogation pulses from the at least one DME interrogator, and
determines Mode C information for the DME interrogator from another source; and
when two or more TDOAs are clustered, determines a position for the DME interrogator from the two TDOAs and the Mode C information.

22. The method of claim 21, wherein the TDOA is determined using the following equation:

$$TDOA = t_1 - t_3 = (t_2 - \tau_2 - t_d) - t_3$$

where: $\tau_2$=Known propagation time between DME transponder and DME listener;
$t_1$=time of arrival of DL signal at DME transponder and $t_1 = t_2 - \tau_2 - t_d$;
$t_2$=time of arrival of UL signal at DME listener;
$t_3$=time of arrival of DL signal at DME listener;
$t_d$=Known DME transponder delay; and
$t_2 - t_3$ is obtained by XCORR {UL, DL}.

23. The method of claim 21, further comprising determining an identity for the DME interrogator using one of Mode A ID or Mode S address.

24. The method of claim 21, further comprising synchronizing clocks between a first DME listener and a second DME listener using a reference transmitter, wherein clock offset is determined before determining the TOA for the received interrogation pulses and reply pulses at each of the first and second DME listeners using the following equation:

$$\text{Clock Offset} = \tau_2 - \tau_1 - (t_2 - t_1)$$

where:
$t_2 - t_1$ is obtained by XCORR {UL @ DME listener #1, UL @ DME listener #2}, and
$\tau_2, \tau_1$=(known DME transponder to DME listener distance)/(speed of light).

25. The method of claim 21, wherein the central computer assumes an altitude for the DME interrogator and determines a coarse position for the DME interrogator before using the Mode C information to determine a refined position for the DME interrogator.

26. The method of claim 21, wherein the at least one DME listener transmits demodulated signal waveforms for the received interrogation pulses and reply pulses from each of the at least two DME listeners to a central computer, and the central computer cross correlates the received interrogation pulses and reply pulses and determines TDOA using the peak position of the correlation output.

27. The method of claim 21, wherein the central computer is selected from the group consisting of DME transponder, DME listener, and SSR transponder based RU.

* * * * *